United States Patent [19]

Pinkett

[11] Patent Number: 4,908,728
[45] Date of Patent: Mar. 13, 1990

[54] VCR PROTECTOR FOR VCR MACHINE

[76] Inventor: Stephen M. Pinkett, 2429 Keyworth Ave., Baltimore, Md. 21215

[21] Appl. No.: 228,500

[22] Filed: Aug. 5, 1988

[51] Int. Cl.⁴ .................... G11B 33/00; E05B 65/00; B65D 55/14
[52] U.S. Cl. ...................................... 360/137; 70/57; 70/163
[58] Field of Search ..................... 360/137; 70/14, 68, 70/57, 58, 158, 163–173

[56] References Cited

U.S. PATENT DOCUMENTS

| | | | |
|---|---|---|---|
| 4,280,226 | 7/1981 | Jenkins | 70/158 |
| 4,527,405 | 7/1985 | Renick et al. | 70/58 |
| 4,616,490 | 10/1986 | Robbins | 70/14 |
| 4,640,106 | 2/1987 | Derman | 70/14 |
| 4,655,057 | 4/1987 | Derman | 360/137 |

Primary Examiner—Stuart N. Hecker
Assistant Examiner—David J. Severin
Attorney, Agent, or Firm—Walter G. Finch

[57] ABSTRACT

A VCR protector is provided to prevent foreign objects from being inserted into a VCR tape entrance port of a machine when the VCR machine is not in use. This VCR protector consists of a housing, with a VCR protector having a pair of elongated shaped openings and spaced levers extending outwardly therethrough. A spring is provided to bias each of a pair of outwardly extending levers. Structure is provided for fastening each of the biased levers. A shield positioned in the front of the housing to prevent the insertion of foreign objects and the further insertion of the device into the tape entrance port by completely blocking the entrance port.

3 Claims, 2 Drawing Sheets

VCR PROTECTOR FOR VCR MACHINE

BACKGROUND AND SUMMARY OF THE INVENTION

This invention relates to protector accessories for VCR's, and more particularly to VCR gating devices.

This VCR protector was invented out of the need to prevent foreign objects from being inserted into a VCR tape entrance port of the machine when the VCR is not in use.

For example, the insertion of objects into the port of the VCR may cause the tape machine to reject the video cassettes immediately upon insertion or cause the video cassettes to jam into position. In both cases, this would require in-shop servicing for the removal of the objects and/or video cassette. Also, there is always the possibility that the insertion of foreign objects into the VCR tape entrance port can cause other damage to the machine.

This protector can also work for other types of cassette machines that is, audio and the like.

SUMMARY OF THE INVENTION

It is an object of this invention to provide a VCR protector to prevent foreign objects from being inserted into a VCR tape entrance port of a machine when the VCR is not in use.

Another object of this invention is to provide a VCR protector which will work for other types of cassette machines, such as an audio machine or the like.

Still another object of this invention is to provide a VCR protector device which will prevent foreign objects from entering into the port of the VCR and thus prevent the video cassettes from being inserted or cause the video cassettes to jam into position.

And still another object of this invention is to provide a VCR protector which will minimize in-shop servicing for removal of objects and/or video cassettes.

BRIEF DESCRIPTION OF THE DRAWINGS

These and other objects and attendant advantages of this invention will become more obvious and understood from the following detailed drawings and specification pertaining thereto.

DESCRIPTION OF THE PREFERRED EMBODIMENTS

Figure 1:
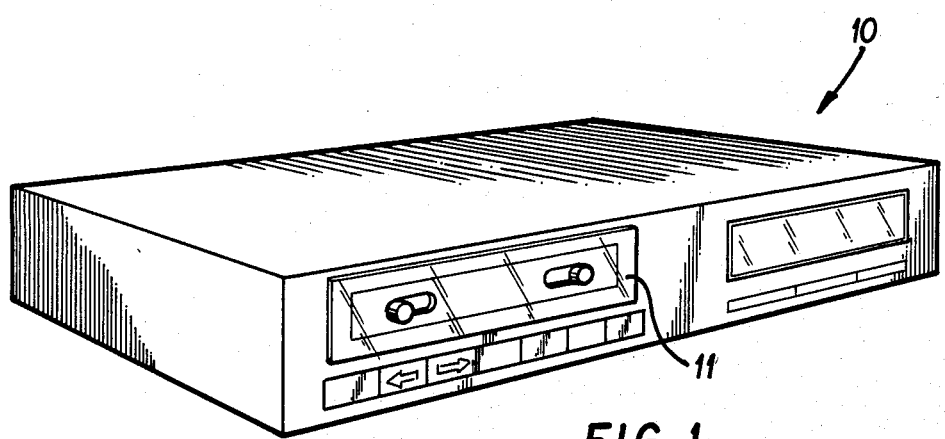
FIG. 1 is a perspective view of a VCR showing a VCR protector of this invention in position.

Referring now to FIG. 1, there is shown a VCR 10 having a VCR protector 11 in position therein.

Figure 2:
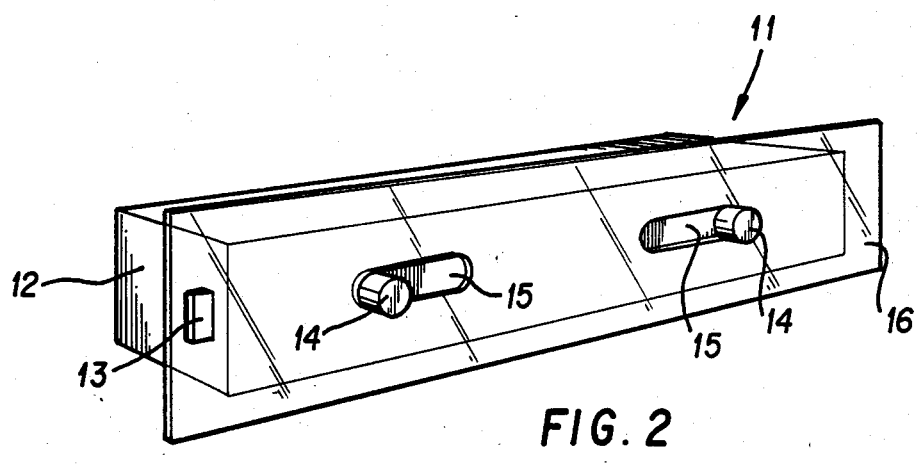
FIG. 2 is a perspective view of a VCR protector incorporating features of this invention.

As shown in FIG. 2, this VCR protector 11 is removed from the environment of the VCR 10. This VCR protector 11 has a rear casing 12 and a fastening device 13.

This casing or housing 12 houses the locking mechanism and it is as wide and as high as the cassette tape used in the machine for which it is made. However, it must be deep enough to hold the locking mechanism, but shallow enough as not to engage any of the machine tape engagement functions.

A pair of spaced levers 14 are located in the VCR protector 11 and extend outwardly there-through the slots 15. A plastic shield 16 is placed around the front of the VCR protector 11. This shield and/or plate 16 prevents the insertion of foreign objects and the further insertion of the device into the tape entrance port by completely blocking that entrance port.

Figure 3:
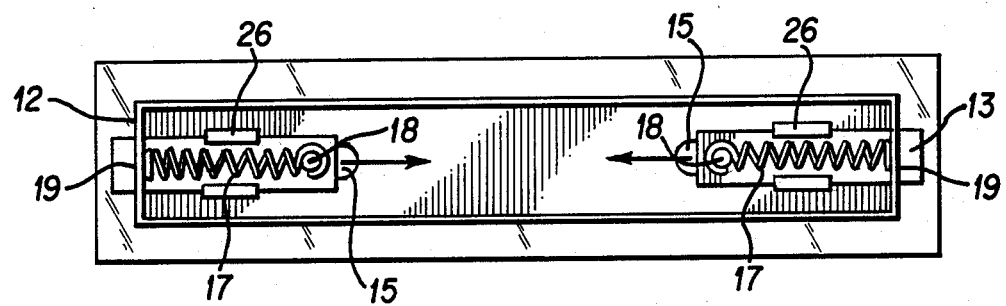
FIG. 3 is a rear view of the VCR protector of FIG. 2.

Referring to FIG. 3, a stud 18 is attached to the tension spring 17, and a fastening device 13 is connected to the other end of the tension spring. Sleeves 26 encompass the fastening device 13.

The fastening device 13 (or pin) holds the protector 11 in place along with the protector shield 16. This fastening device 13 is ordinarily in the out or protruding position and they are retracted by use of the levers 14 for insertion and extraction of the VCR protector 11.

The pin lever 14 is a part of the locking pin and is used by placing the thumb on the outside on the lever 14 and the index or middle finger on the outside of the other lever 14 and applying inward pressure (squeeze). This will retract the locking pin 13 so that the device can be inserted or extracted from the cassette entrance port of the machine 10.

The lever slot 15 allows the locking pins 13 to be retracted by squeezing the levers 14 inwardly. This provides an avenue of motion for the locking pins 13.

As shown in FIG. 3, this tension spring 17 provides the necessary tension to keep the locking pin in the protruded position and also provides enough tension to thwart attempts at removal by very small children. The tension springs 17 are attached to the mechanism housing at one end and the locking pin 13 at the other.

The spring secure pin 18, shown in FIG. 3, is used to secure the tension spring 17 to the locking pin 13. A locking pin port 19 is provided to allow the entrance and exit of the locking pin 13 into and out of the mechanism and/or machine casing 10.

The locking pin slide 26 guides and anchors the parts. These slides 26 guide and anchor the locking pin and gives a direct avenue of motion as well as hold it down without restricting its necessary movement.

Figure 4:
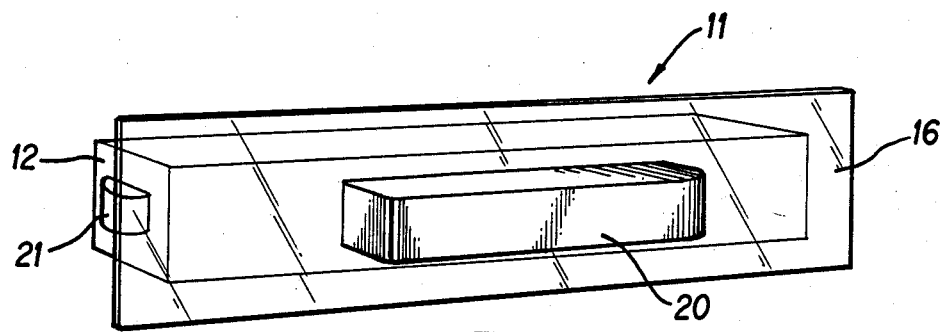
FIG. 4 is a perspective view of a second embodiment of the VCR protector.

Referring now to FIG. 4, a second embodiment of the invention is shown. The parts, namely the VCR protector 11, the mechanical casing 12, and the protector plate 16, have been discussed with respect to FIGS. 1 to 3. This embodiment of the invention shows a handle 20 for the device which is used to grasp while inserting and extracting from the device.

A nylon or rubber (wheel lock) 21 when inserted, the spring metal located behind the wheel gives and allows the wheel inside the cassette entrance port. Once inside the spring 23, the metal returns to its normal firm position locking the device in place.

Figure 5:
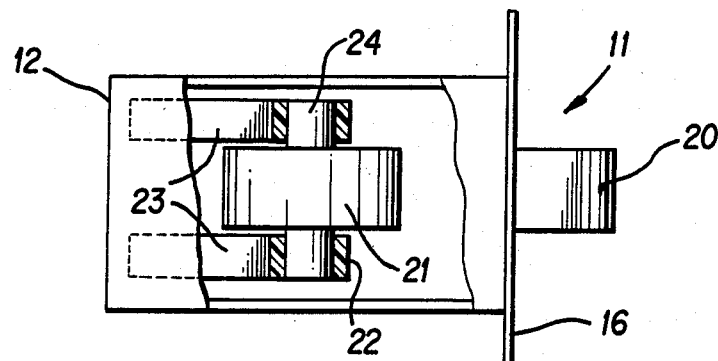
FIG. 5 is a cut-away side view of the VCR protector.

Referring now to FIG. 5, the parts, as indicated by reference numerals 11, 12, 16, 20 and 21 have been previously discussed.

Figure 7:
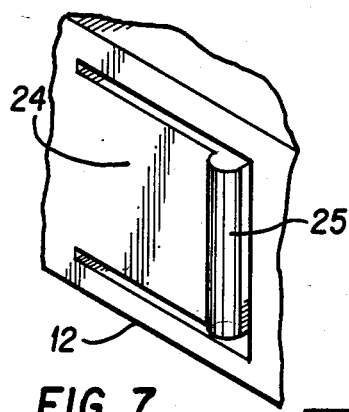
FIG. 7 is a perspective view of the third embodiment of the VCR protector.
Figure 6:
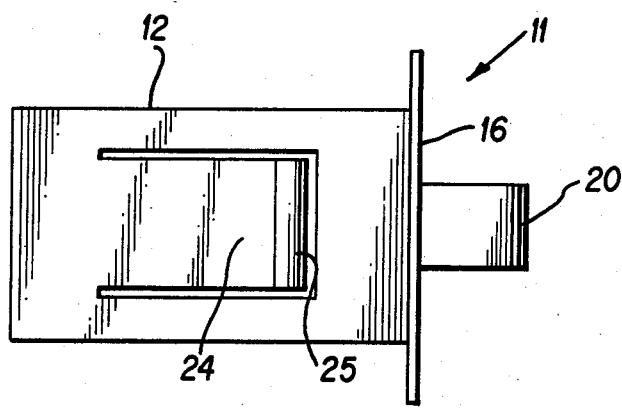
FIG. 6 is a side view of a third embodiment of the VCR protector.

As indicated in FIGS. 5 to 7, the bushing 22 allows the free movement of the wheel 21, while the axis 24 allows the wheel to rotate within the casing of the device 10. A cutaway opening allows the wheel 21 to protrude. Spring metal 23 allows the wheel 21 to retract when being inserted into or extracted from the cassette entrance port.

FIGS. 6 and 7 show yet another embodiment of the invention. Parts 11, 12, 16 and 20 have been explained. A plastic spring 24 will retract when the device is inserted into and extracted from the cassette entrance port, while a locking lip 25 locks the device in place once it has been engaged.

What is claimed is:

1. A VCR protector is provided to prevent foreign objects from being inserted into a VCR tape entrance port of a VCR machine when the VCR machine is not in use, comprising, a housing, a VCR protector in said housing having a pair of elongated shaped openings provided therein with spaced levers extending outwardly therethrough said openings, coiled spring means for spring biasing each of said outwardly extending levers to lock said VCR protector in said entrance part, means for fastening each of said biased levers to said housing, and a shield means positioned in the front of said housing to prevent the insertion of foreign objects into the tape entrance port by completely blocking the entrance port.

2. A VCR protector is provided to prevent foreign objects from being inserted into a VCR tape entrance port of a VCR machine when the VCR machine is not in use, comprising, a housing, a VCR protector in said housing having a pair of elongated shaped openings provided therein with spaced levers extending outwardly therethrough said openings, coiled spring means for spring biasing each of said outwardly extending levers to lock said VCR protector in said entrance port, and means for fastening each of said biased levers to said housing.

3. A VCR protector to prevent foreign objects from being inserted into a VCR tape entrance port of a VCR machine when the VCR machine is not in use, comprising, a housing, a VCR protector in said housing having a pair of elongated shaped openings with spaced levers extending outwardly through said openings, coiled spring means for spring biasing each of said outwardly extending levers to fasten said VCR protector in said entrance port, means for fastening each of said biased levers to said housing, and additionally shield means positioned in said housing to prevent the insertion of foreign objects in said entrance port.

* * * * *